United States Patent
Mashimo

(10) Patent No.: US 7,817,527 B2
(45) Date of Patent: Oct. 19, 2010

(54) OPTICAL DISK DRIVE AND METHOD FOR RECORDING DATA

(75) Inventor: Akira Mashimo, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 413 days.

(21) Appl. No.: 11/796,538

(22) Filed: Apr. 26, 2007

(65) Prior Publication Data

US 2007/0253307 A1    Nov. 1, 2007

(30) Foreign Application Priority Data

Apr. 28, 2006    (JP)    ............................... 2006-124620

(51) Int. Cl.
G11B 7/24    (2006.01)

(52) U.S. Cl. .................................. 369/275.3

(58) Field of Classification Search ........................ None
See application file for complete search history.

(56) References Cited

U.S. PATENT DOCUMENTS

| | | | | |
|---|---|---|---|---|
| 7,177,256 | B2 * | 2/2007 | Motohashi | 369/59.25 |
| 7,480,225 | B2 * | 1/2009 | Woerlee et al. | 369/94 |
| 2003/0058763 | A1 | 3/2003 | Noda | |
| 2005/0226133 | A1 * | 10/2005 | Ueki | 369/275.3 |
| 2006/0198265 | A1 * | 9/2006 | Sasaki | 369/53.24 |
| 2006/0215516 | A1 * | 9/2006 | Teranishi | 369/47.53 |
| 2006/0274626 | A1 * | 12/2006 | Kawashima et al. | 369/59.24 |
| 2007/0047398 | A1 * | 3/2007 | Yamamoto et al. | 369/30.09 |
| 2007/0053267 | A1 * | 3/2007 | Brondijk | 369/53.24 |
| 2007/0201343 | A1 * | 8/2007 | Kuroda et al. | 369/275.3 |
| 2008/0225659 | A1 * | 9/2008 | Kuroda et al. | 369/53.11 |
| 2009/0040899 | A1 * | 2/2009 | Namiki et al. | 369/94 |
| 2009/0060459 | A1 * | 3/2009 | Ishii et al. | 386/109 |
| 2009/0279417 | A1 | 11/2009 | Terui | |

FOREIGN PATENT DOCUMENTS

| | | |
|---|---|---|
| CN | 1410972 A | 4/2003 |
| EP | 1 160 773 A1 | 12/2005 |
| JP | 2005093032 A | 4/2005 |

OTHER PUBLICATIONS

Office Action relating to Japanese Patent Application 2006-124620, mailed Mar. 2, 2010, 3 pages.
First Examination Report dated Sep. 5, 2008, issued in corresponding Chinese Application No. 200710101978.7.

* cited by examiner

*Primary Examiner*—Joseph H Feild
*Assistant Examiner*—Henok G Heyi
(74) *Attorney, Agent, or Firm*—Seed IP Law Group PLLC

(57) ABSTRACT

Recording of data into a multilayer optical disk and reliable reproduction of the data are enabled. When user data are recorded on a multilayer optical disk having a first layer L0 and a second layer L1, the second layer L1 is formatted beforehand, to thus record dummy data. Subsequently, the user data are recorded into the first layer L0. Even after completion of recording of the user data at some point in the first layer L0, an area of the second layer L1 located immediately above or below a recorded area of the first layer L0 remains in a recorded state at all times. Compatibility with a play-only disk is maintained, and the play-only drive can reproduce the user data immediately after recording of the data.

7 Claims, 3 Drawing Sheets

OPTICAL DISK DRIVE AND METHOD FOR RECORDING DATA

PRIORITY INFORMATION

This application claims priority to Japanese Patent Application No. 2006-124620, filed on Apr. 28, 2006, which is incorporated herein by reference in its entirety.

BACKGROUND

1. Technical Field

The present invention relates to an optical disk drive and a method for recording data, and more particularly to a method for recording user data on a multilayer optical disk.

2. Related Art

In addition to including a play-only DVD of single-sided single layer type, DVDs include a play-only DVD of single-sided double layer type, rewritable single-layer or double-layer DVD±R or DVD±RW, and the like. In a double-layer DVD, tracks are created from an inner radius toward an outer radius in both first and second layers. There may be a case where tracks are created from the inner radius toward the outer radius in the first layer, and in the second layer tracks are created reversely from the outer radius to the inner radius.

In such a double-layer DVD, when user data are recorded in the first layer, there is conceivable a case where data recording is terminated at any point in a data area of the second layer or without recording data on the second layer at all, and an unrecorded area is left in a data area of the second layer. Thus, in a state where data are recorded only in the first layer and no data are recorded in the second layer, compatibility with the play-only DVD of double layer is not maintained (data are recorded in both the first and second layers of the play-only DVD), and difficulty is encountered in playing the user data recorded in the first layer by means of a play-only drive.

JP 2005-93032 A points out the above drawback and describes performance of processing pertaining to a corresponding unrecorded area data filling process of determining whether or not recorded areas are present in at least a data area of the first recording layer; and, when the recorded area is present in the first recording layer, recording dummy data in an unrecorded area in a region located at the same radial position as that of the recorded area in the second recording layer exclusive of the first recording layer at predetermined timing before completion of recording of data in the optical disk. There is also described that, in a case where a data recording request issued by the user has been received during background format processing when the optical disk is formatted in the background, formatting operation performed in the background is interrupted, to thus record dummy data.

FIG. 5 shows a flowchart of related-art processing. Provided that a first recording layer (a first layer) is taken as L0 and that a second recording layer (a second layer) is taken as L1, user data are recorded first in L0 (S101). After recording of user data, a determination is made as to whether or not an area of L1 located immediately above or below a recorded area of L0 remains unrecorded (S102). When the area does not remain unrecorded, compatibility with the play-only disk is maintained, and hence data in the area can be played, in unmodified form, by means of a play-only device (drive) (S104). Meanwhile, when an unrecorded area is determined to be present in L1, predetermined dummy data are recorded in a corresponding area of L1, thereby converting the unrecorded area into a recorded area (S103). After compatibility with the play-only disk has been maintained, the optical disk is played by means of the play-only drive (S104).

However, a problem of determination processing and dummy data writing operation involving consumption of time arises in connection with the configuration of determining whether or not an area of the second layer located immediately above or below the recorded area of the first layer remains unrecorded after completion of recording of data in the first layer, and recording dummy data into an unrecorded area of the second layer according to a result of determination. In relation to background processing, the same also applies to a case where dummy data are written by means of interrupting formatting operation when an optical disk is formatted. Since the time for writing dummy data is required, time is consumed from when data are finally recorded until when an optical disk can be ejected.

SUMMARY

The present invention provides an apparatus and a method, which obviate processing for writing dummy data after completion of recording of user data, thereby shortening a processing time.

The present invention provides an optical disk drive for recording user data into a multilayer optical disk having at least first and second layers, comprising:

dummy data recording means for recording dummy data into at least the second layer prior to recording of the user data into the first layer; and user data recording means for recording the user data into the first layer after recording of the dummy data into the second layer.

Moreover, the present invention also provides a data recording method for recording user data into a multilayer optical disk having at least first and second layers, comprising:

performing formatting operation for recording dummy data into at least the second layer prior to recording of the user data into the first layer; and recording the user data into the first layer after recording of the dummy data.

According to the present invention, dummy data are recorded into the second layer prior to recording of the user data into the first layer. Hence, an area of the second layer located immediately above or below the recorded area of the first layer serves as a recorded area, and the user data of the first layer can be reproduced immediately after recording of the user data.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following figures, wherein.

DETAILED DESCRIPTION

An embodiment of the present invention will be described hereunder by reference to the drawings.

Figure 1:
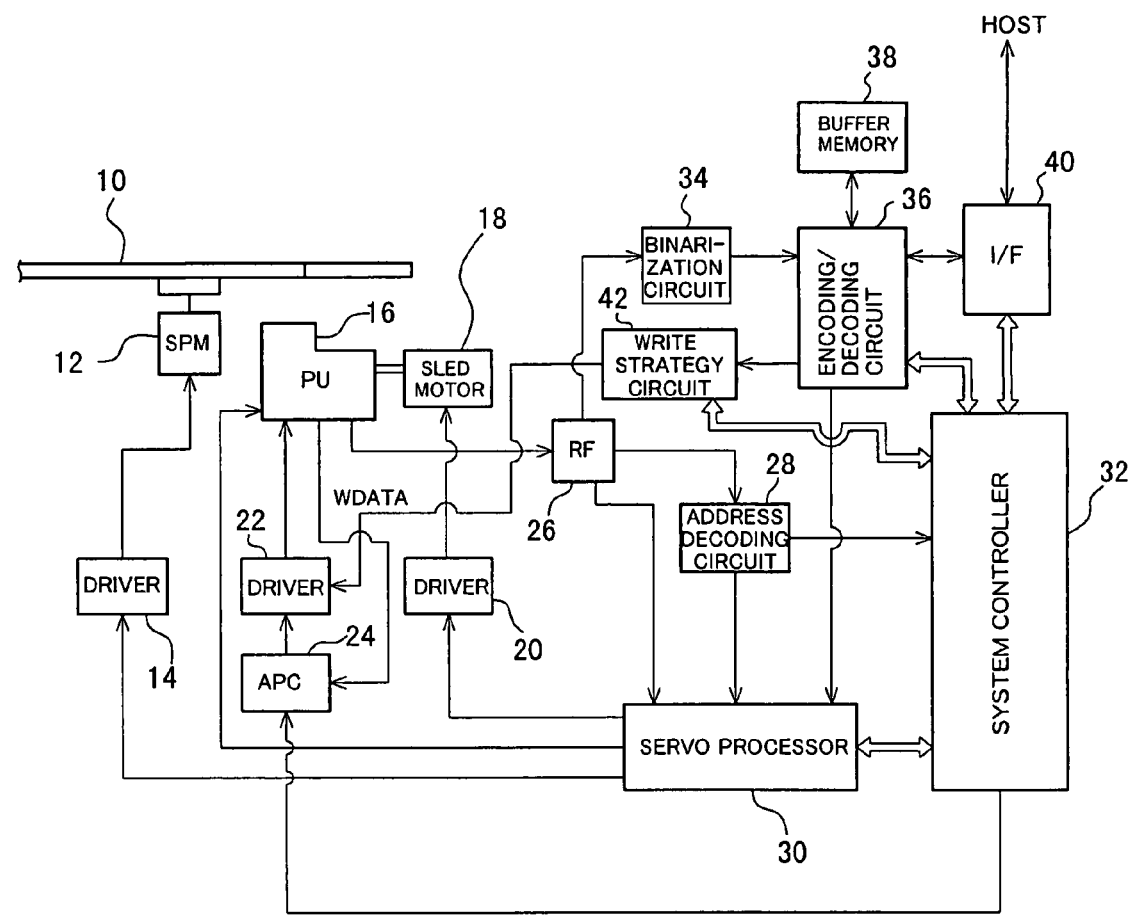
FIG. 1 is a block diagram showing the configuration of an optical disk drive.

FIG. 1 shows the overall block diagram of an optical disk drive according to an embodiment. A recordable optical disk 10, such as a DVD±R, a DVD±RW, a DVD-RAM, or the like, is rotationally driven by a spindle motor (SPM) 12. The spindle motor SPM 12 is driven by a driver 14, and the driver 14 is servo-controlled by a servo processor 30 so as to achieve a desired rotational speed.

An optical pickup 16 includes a laser diode (LD) for irradiating the optical disk 10 with a laser beam, and a photodetector (PD) for receiving light reflected from the optical disk 10 and converting the thus-received light into an electrical signal; and is disposed opposite the optical disk 10. The optical pickup 16 is driven by a sled motor 18 in a radial direction of the optical disk 10, and the sled motor 18 is driven by a driver 20. As in the case of the driver 14, the driver 20 is servo-controlled by the servo processor 30. Moreover, the LD of the optical pickup 16 is driven by a driver 22, and the driver 22 is controlled by an auto-power control circuit (APC) 24 such that a drive current assumes a desired value. The APC 24 and the driver 22 control the amount of light emitted by the LD in accordance with a command from a system controller 32. In the drawing, the driver 22 is provided separately from the optical pickup 16, but the driver 22 may also be provided in the optical pickup 16.

When the data recorded in the optical disk 10 are reproduced, a laser beam of reproduction power is emitted from the LD of the optical pickup 16; the reflected light is converted into an electrical signal by the PD; and the electrical signal is then output. A reproduced signal from the optical pickup 16 is supplied to an RF circuit 26. The RF circuit 26 generates a focus error signal and a tracking error signal from the reproduced signal, and supplies the servo processor 30 with the thus-generated error signals. In accordance with these error signals, the servo processor 30 servo-controls the optical pickup 16, thereby maintaining the optical pickup 16 in an on-focus state and an on-track state. The RF circuit 26 supplies an address decoding circuit 28 with an address signal included in the reproduced signal. The address decoding circuit 28 demodulates, from the address signal, address data pertaining to the optical disk 10, and supplies the thus-demodulated address data to the servo processor 30 and the system controller 32.

One example address signal is a wobble signal. Tracks of the optical disk 10 are wobbled by means of a modulation signal of time information showing an absolute address of the optical disk 10; a wobble signal is extracted from a reproduced signal; and the thus-extracted wobble signal is decoded, whereby address data (ATIP) are acquired. The RF circuit 26 supplies a binarization circuit 34 with a reproduced RF signal. The binarization circuit 34 binarizes the reproduced signal and supplies the thus-acquired signal to an encoding/decoding circuit 36. The encoding/decoding circuit 36 demodulates a binarized signal and subjects the demodulated signal to error-correction, to thus generate reproduced data; and outputs the reproduced data to a host machine, e.g., a personal computer or the like, by way of an interface I/F 40. When the reproduced data are output to the host machine, the encoding/decoding circuit 36 temporarily accumulates reproduced data into buffer memory 38 and outputs the thus-accumulated reproduced data.

When the data are recorded in the optical disk 10, data to be recorded are supplied from the host machine to the encoding/decoding circuit 36 via the interface I/F 40. The encoding/decoding circuit 36 stores into the buffer memory 38 the data to be recorded; encodes the data to be recorded; and supplies the encoded data as modulated data to a write strategy circuit 42. The write strategy circuit 42 converts the modulated data into a multipulse (a pulse train) according to a predetermined recording strategy, and supplies the thus-converted data as record data to the driver 22. Since the recording strategy affects recording quality, optimization is performed prior to recording of data. Specifically, test data are tentatively written into a predetermined test area of the optical disk 10 while the recording strategy is being changed in various manners, and the tentatively-written test data are reproduced. The quality of the reproduced signal is evaluated. An optimum recording strategy is selected in accordance with a result of evaluation. The laser beam whose power has been modulated by the record data is emitted from the LD of the optical pickup 16, whereupon the data are recorded on the optical disk 10. After recording of the data, the optical pickup 16 emits a laser beam of reproduction power, to thus reproduce the record data; and supplies the RF circuit 26 with the thus-reproduced record data. The RF circuit 26 supplies the reproduced signal to the binarization circuit 34, and the thus-binarized data are supplied to the encoding/decoding circuit 36. The encoding/decoding circuit 36 decodes the modulated data and verifies the thus-decoded data against the record data stored in the buffer memory 38. A result of verification is supplied to the system controller 32. In accordance with the result of verification, the system controller 32 determines whether to continually record the data or perform changing operation.

The system controller 32 controls operation of the overall system and performs particularly OPC (Optimum Power Control or Optimization of Recording Power) prior to recording operation and optimization of the recording strategy. By means of OPC, test data are tentatively written in the test area of the optical disk 10 by means of changing the recording power stepwise; the tentatively-written test data are reproduced; and a β value, a γ value, the degree of modulation, an error rate, and the like of the reproduced data are measured. Recording power—at which the quality of the reproduced signal, such as an error rate or the like, assumes a desired value—is selected and taken as optimum recording power Po. The system controller 32 controls the driver 22 such that selected recording power Po is achieved. By means of optimization of a recording strategy, test data are tentatively written by means of changing a recording strategy for each type of the optical disk 10. An error rate, or the like, is measured by reproduction of the test data, and each of the recording strategies is evaluated according to a specific evaluation standard.

In such a configuration, when the optical disk 10 is a recordable multilayer optical disk, such as a double-layer DVD-R or the like, recording is commenced from a first layer. When recording of user data is completed at some point in the first layer or a second layer, an unrecorded area is present in a region of the second layer located immediately above or below the recorded area of the first layer. Even in a case where data of the first layer are reproduced by means of the play-only drive, when the laser beam is focused on the second layer as a result of seeking of a target address, address information cannot be acquired if no data are recorded in the second layer, which hinders reproduction of data of the first layer. Alternatively, in a case where a tracking error signal is generated from a phase-difference signal of a quadrant photodetector (a signal pertaining to a phase difference between two signals output from photodetectors split into a radial direction), a tracking error signal cannot be generated when no data are recorded, which in turn hinders tracking servo.

If, when an unrecorded area is present in the region of the second layer located immediately above or below the recorded area of the first layer, there is performed filling operation of recording dummy data in the second layer, to thus fill the unrecorded area, as in the case of the related art, processing involves consumption of much time, thereby deteriorating convenience for the user.

To prevent deterioration of convenience, in the system controller 32 of the embodiment, even when recording of the user data is completed at some point in the first layer or the second layer, the optical pickup 16 and the write strategy circuit 42 are driven such that no unrecorded area is present in the region of the second layer located immediately above or below the recorded area of the first layer, thereby recording dummy data into the second layer in advance. Specifically, dummy data are recorded in advance into the second layer before the user records user data into the first layer. As a result of performance of such pre-processing, the entire second layer comes to a recorded area, thereby obviating processing for determining whether or not the region of the second layer located immediately above or below the recorded area of the first layer remains unrecorded, as well as obviating processing for filling the unrecorded area with dummy data after recording of the user data. The dummy data may also be random data or only data having a data length 3T. Alternatively, the recording power or strategy employed at the time of recording of dummy data may be optimum power or an optimum strategy adopted when the user data are recorded, and is not necessarily optimized.

Figure 2:
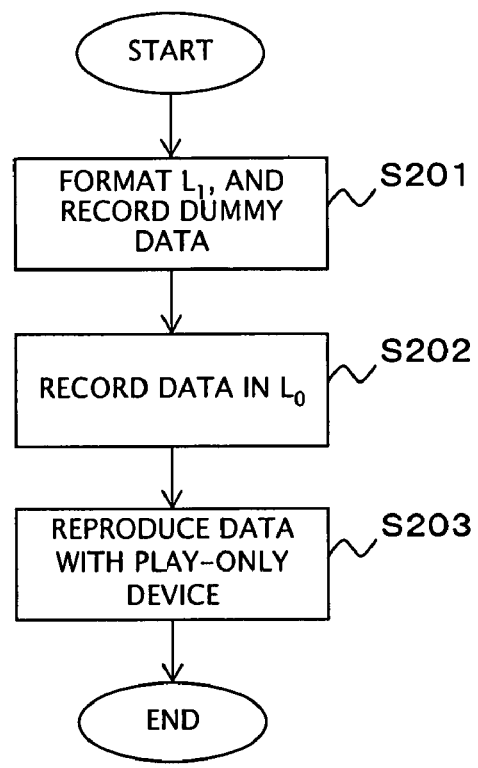
FIG. 2 is a flowchart of processing of an embodiment.

FIG. 2 shows a flowchart of processing of the present embodiment. An L1 layer is formatted prior to recording of user data to an L0 layer, and dummy data are recorded in the entire user data area of the L1 layer during formatting operation (S201). After completion of formatting of the L1 layer, user data are recorded in the L0 layer (S202). When recording the user data to the L0 layer has been completed, the dummy data are already present in the L1 layer. Hence, the user data of the L0 layer can be reproduced by the play-only device immediately after recording of data (S203).

When the optical disk is rewritable, the user data can be written over the layer L1 even after the dummy data have been recorded in the layer L1. Therefore, a decrease in storage capacity does not arise. However, in the case of an non-rewritable optical disk, such as a DVD-R or the like, when dummy data are recorded over the entire user data area of the layer L1, the storage capacity is decreased correspondingly. Consequently, in this case, the extent to which an area of the L0 serves as a recorded area is computed through arithmetic operation from the amount of user data to be recorded. Of the L1 layer, dummy data may also be recorded with an L1 format in only an area located immediately above or below a predicted recorded area of the L0 layer.

Figure 3:
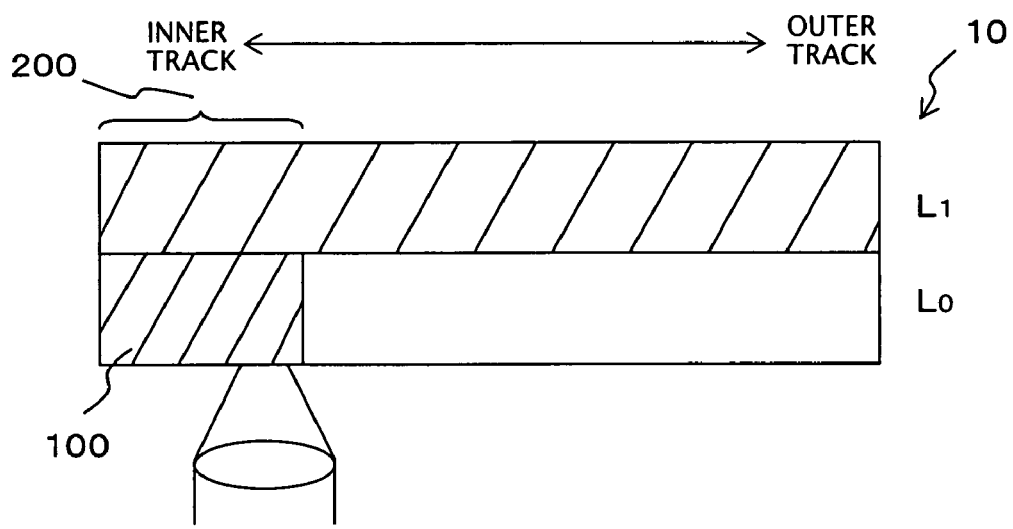
FIG. 3 is a descriptive view for recording data on an optical disk.

FIG. 3 shows the state of recording of data into the optical disk in the present embodiment. Provided that data are recorded in the layer L0 serving as the first layer, the dummy data (hatched in the drawing) have already been recorded in the layer L1 prior to recording of data into the layer L0. In this state, user data are recorded in the layer L0. At a point in time when recording of the user data has been completed, an area 200 of the layer L1 located immediately above or below a recorded area 100 of the layer L0 is a recorded area, and the same conditions as those applied to a play-only disk are achieved. Accordingly, the optical disk can be ejected from the optical disk drive immediately after recording of the user data, and the optical disk is inserted into the play-only device, to thus enable reproduction of the user data of the layer L0.

Figure 4:
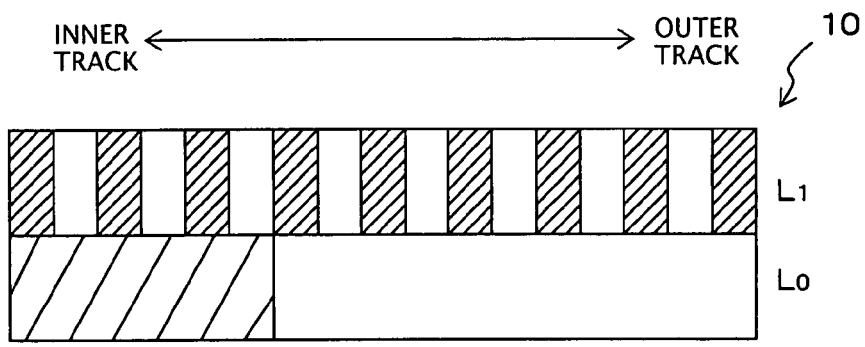
FIG. 4 is a descriptive view for recording other data on the optical disk.
Figure 5:
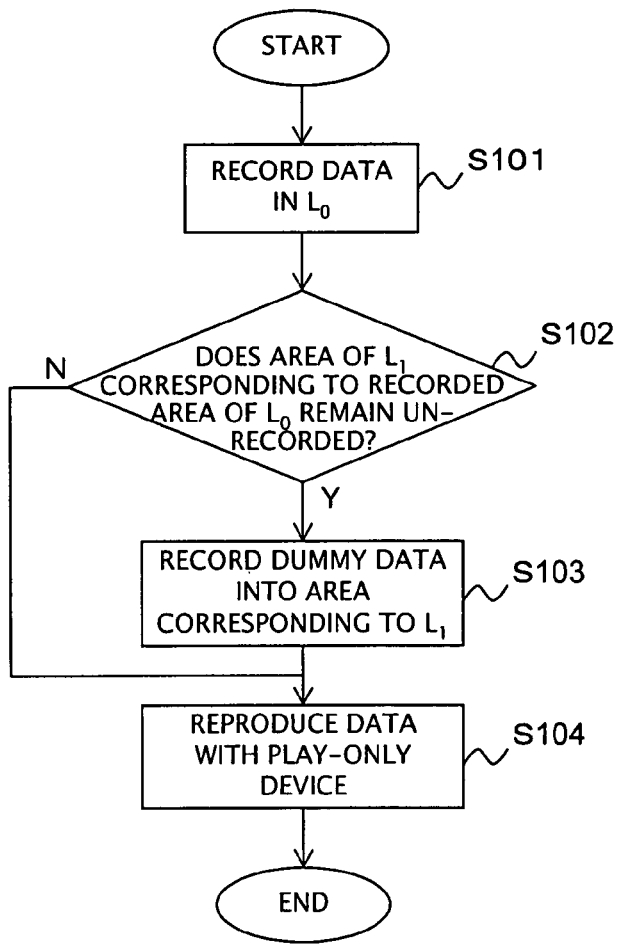
FIG. 5 is a flowchart of related-art processing.

When dummy data are recorded in the layer L1, dummy data may be recorded intermittently rather than dummy data being recorded so as to fill the user data area of the layer L1 without involvement of an interstice. The reason for this is that the essential requirement is to record dummy data to such an extent that the user data in the layer L0 can be reproduced. Consequently, for instance, dummy data may recorded intermittently, by means of repeating recording/non-recording of the dummy data in units comprising a plurality of ECC blocks. FIG. 4 diagrammatically shows a case where dummy data are recorded intermittently. At the outset, dummy data may be recorded intermittently at given intervals. When the user data recorded in the layer L0 cannot be reproduced, the predetermined intervals may also be adjusted so as to become gradually shorter.

In the present embodiment, the dummy data are recorded into the layer L1 prior to recording of the user data. However, in a rewritable optical disk such as a DVD-RW or the like, dummy data may also be recorded into both the L0 and L1 layers. When the user data are recorded into the layer L0, the dummy data are recorded in an overwriting manner.

Moreover, in the present embodiment, dummy data are recorded in the layer L1 during formatting operation preceding recording of user data. However, in a rewritable optical disk, dummy data may be recorded in the layer L1 at a stage of shipment of an optical disk from the factory, so that when the user purchases the optical disk the optical disk may be in a formatted state where the dummy data have already been recorded in the layer L1.

What is claimed is:

1. An optical disk drive for recording user data into a multilayer optical disk having at least first and second layers, comprising:

dummy data recording means for recording dummy data into at least the second layer prior to recording of the user data into the first layer; and user data recording means for recording the user data into the first layer after recording of the dummy data into the second layer, wherein after completion of recording of the user data in the first layer, no region of the second layer located immediately above or below the recorded area of the first layer remains unrecorded.

2. The optical disk drive according to claim 1, wherein the dummy data recording means computes, from an amount of data to be recorded, an extent to which an area of the first layer becomes a recorded area, and records the dummy data into only an area of the second layer located immediately above or below the recorded area of the first layer.

3. The optical disk drive according to claim 1, wherein the dummy data recording means records the dummy data into the first and second layers when the multilayer optical disk is a rewritable optical disk.

4. An optical disk drive for recording user data into a multilayer optical disk having at least first and second layers, the drive comprising:

an optical pickup for irradiating the multilayer optical disk with a laser beam; and a controller which actuates the optical pickup, to thus record the user data from an inner track to an outer track of the first layer, records the user data from an outer track to an inner track of the second layer after completion of recording of the user data into the first layer, records dummy data into at least the second layer prior to recording of the user data into the first layer, and records the user data into the first layer after recording of the dummy data, wherein after completion of recording of the user data in the first layer, no region of the second layer located immediately above or below the recorded area of the first layer remains unrecorded.

5. A data recording method for recording user data into a multilayer optical disk having at least first and second layers, comprising:

performing formatting operation for recording dummy data into at least the second layer prior to recording of the user data into the first layer; and recording the user data into the first layer after recording of the dummy data, wherein after completion of recording of the user data in the first layer, no region of the second layer located immediately above or below the recorded area of the first layer remains unrecorded.

6. A data recording method for recording user data into a multilayer optical disk having at least first and second layers, comprising:

performing formatting operation for recording dummy data into at least the second layer prior to recording of the user data into the first layer; and recording the user data into the first layer after recording of the dummy data, wherein the dummy data are recorded intermittently into the second layer by repeating recording and non-recording of the dummy data in units.

7. An optical disk drive for recording user data into a multilayer optical disk having at least first and second layers, comprising:

dummy data recording means for recording dummy data into at least the second layer prior to recording of the user data into the first layer; and user data recording means for recording the user data into the first layer after recording of the dummy data into the second layer, wherein the dummy data recording means intermittently records the dummy data into the second layer by repeating recording and non-recording of the dummy data in units.

* * * * *